United States Patent
Osada et al.

(10) Patent No.: US 10,455,114 B2
(45) Date of Patent: Oct. 22, 2019

(54) IMAGE READING APPARATUS, CONTROL METHOD FOR IMAGE READING APPARATUS, AND STORAGE MEDIUM

(71) Applicant: CANON KABUSHIKI KAISHA, Tokyo (JP)

(72) Inventors: Tomoaki Osada, Yokohama (JP); Kazuki Maruyama, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/826,403

(22) Filed: Nov. 29, 2017

(65) Prior Publication Data

US 2018/0160008 A1 Jun. 7, 2018

(30) Foreign Application Priority Data

Dec. 1, 2016 (JP) .................... 2016-233878

(51) Int. Cl.
*H04N 1/32* (2006.01)
*H04N 1/00* (2006.01)

(52) U.S. Cl.
CPC ....... *H04N 1/3263* (2013.01); *H04N 1/00588* (2013.01); *H04N 1/00708* (2013.01); *H04N 1/00726* (2013.01); *H04N 1/00771* (2013.01); *H04N 1/00917* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2010/0134822 A1* | 6/2010 | Kimura | G06F 3/1222 358/1.14 |
| 2010/0140865 A1* | 6/2010 | Bakker | B65H 5/062 271/264 |
| 2012/0155993 A1* | 6/2012 | Masunari | B42C 9/0056 412/37 |

FOREIGN PATENT DOCUMENTS

| | | |
|---|---|---|
| JP | H10221897 A | 8/1998 |
| JP | 2001285595 A | 10/2001 |

* cited by examiner

*Primary Examiner* — Frantz Bataille
(74) *Attorney, Agent, or Firm* — Canon U.S.A., Inc. IP Division

(57) ABSTRACT

An image reading apparatus includes: a feeding unit that feeds a document sheet of a document; a reading unit that reads the document sheet fed by the feeding unit; a detection unit that detects that the document sheet fed by the feeding unit is bound to another document sheet; a controller that interrupts feeding of the document sheet by the feeding unit in accordance with detection by the detection unit that the document sheet fed by the feeding unit is bound to another document sheet; and a display unit that displays a screen that provides a notification of an action to be taken to read the document whose feeding has been interrupted in accordance with the detection by the detection unit.

14 Claims, 7 Drawing Sheets

IMAGE READING APPARATUS, CONTROL METHOD FOR IMAGE READING APPARATUS, AND STORAGE MEDIUM

BACKGROUND

Field

The present disclosure relates to an image reading apparatus, a control method for the image reading apparatus, and a storage medium.

Description of the Related Art

Japanese Patent Laid-Open No. 2001-285595 discloses an image reading apparatus that is used in a copying machine or the like. In the image reading apparatus, document sheets are fed one by one with a document feeder (an automatic document feeder (ADF) to be described), and an image of each document sheet is read by a charge-coupled device (CCD) sensor fixed on a feeding path for the document sheet.

In such an image reading apparatus having the above-described configuration, in feeding document sheets, a document stack from which a staple or clip has not been removed can be placed on a document tray, and a reading instruction can be executed in some cases. In an automatic document feeder, document sheets are separated and fed one by one by a separation mechanism of a feeding unit, in part by applying a load to a portion of an uppermost document sheet when the uppermost document sheet is separated and fed. Thus, when a feeding operation is started with a bound document stack being placed on the document tray, a load can be applied to a binding portion when an uppermost document sheet is separated and fed.

This can cause a document sheet to be wrinkled or torn in some cases. Furthermore, when bound document sheets are fed without being separated, other problems, such as a paper jam on a feeding path, can occur in some cases.

Thus, to avoid such situations, an apparatus has been proposed that detects that document sheets have been bound or fastened with a staple, a clip, or the like.

In a technique disclosed in Japanese Patent Laid-Open No. 10-221897, for example, when it is detected that document sheets placed on a document tray have been bound or fastened with a staple, a clip, or the like, a display indicating that the document sheets consist of a stapled document is provided on a display unit, and an image reading operation performed by the apparatus is stopped.

In the related art, after a bound document is detected, a job has to be aborted to remove a staple or the like, place the document from which the staple or the like has been removed on the document tray, and read the document from the beginning as a new job, or alternatively, where the job is not aborted, a staple has to be removed from the document in a recovery process after the detection of the bound document. It takes a certain time to remove a staple.

In the case where an image reading apparatus, such as a multi-function printer, has a scanning function, if there are multiple users who use a function other than an image reading function at the same time, when a recovery process for a stapled document is performed in the above-described image reading operation, a next user can be kept waiting for a long time.

Furthermore, if a job is aborted so that a next user is not kept waiting, data having been read before then is lost, thereby resulting in a waste of the time taken to read the data, for example.

SUMMARY

Various embodiments of the present disclosure are directed to addressing the above-described issues. Various embodiments provide a mechanism that, if a scan job is interrupted because a stapled document has been fed, enables a process of resuming the scan job from the beginning or a process of sending image information having been read before the scan job is interrupted, to be selected.

According to one embodiment of the present disclosure, an image reading apparatus includes: a feeding unit configured to feed a document sheet of a document; a reading unit configured to read the document sheet fed by the feeding unit; a detection unit configured to detect that the document sheet fed by the feeding unit is bound to another document sheet; a controller configured to interrupt feeding of the document sheet by the feeding unit in accordance with detection by the detection unit that the document sheet fed by the feeding unit is bound to another document sheet; and a display unit configured to display a screen that provides a notification of an action to be taken to read the document whose feeding has been interrupted in accordance with the detection by the detection unit.

Further features will become apparent from the following description of exemplary embodiments with reference to the attached drawings.

DESCRIPTION OF THE EMBODIMENTS

Next, exemplary embodiments will be described with reference to the drawings.

Description of System Configuration

First Embodiment

Figure 1:
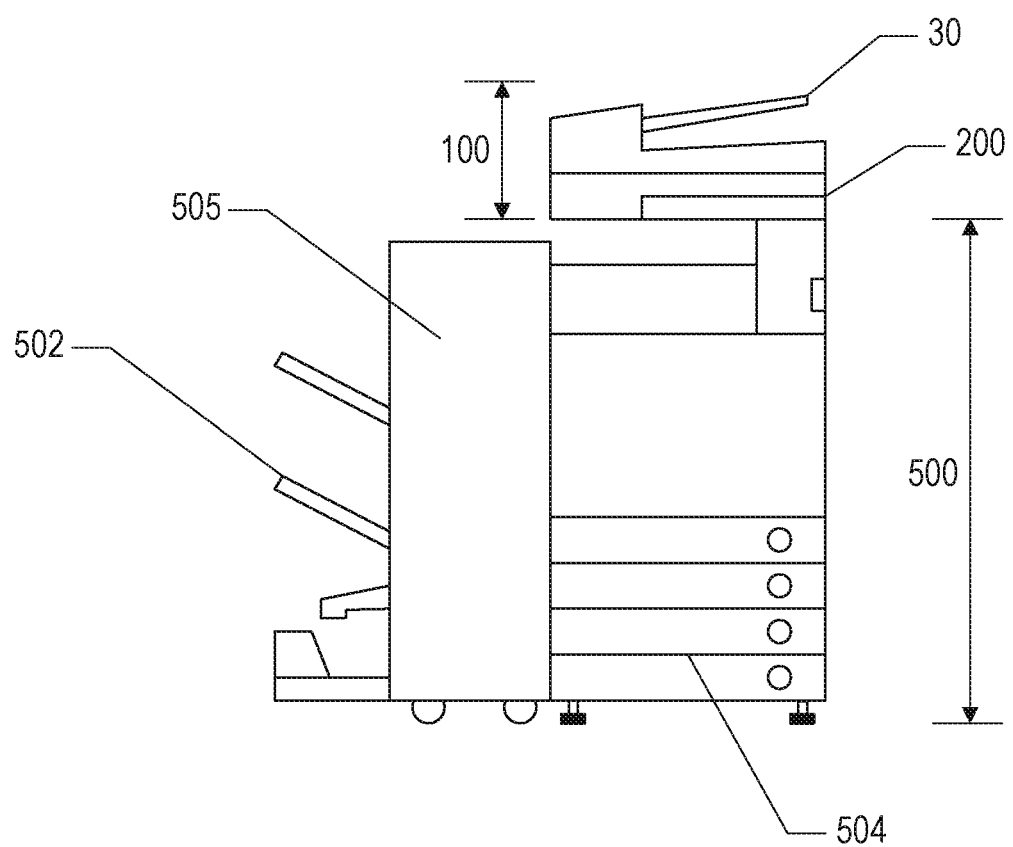
FIG. 1 illustrates an example of the external appearance of an image forming apparatus according to one embodiment.

FIG. 1 illustrates an example of the external appearance of an image forming apparatus including an image reading apparatus according to one embodiment. In the present embodiment, as an example of the image forming apparatus, a multi-function printer (MFP) having a scanning function, a print function, a copy function, and a send function is given.

In FIG. 1, an image reader 200 serving as an image reading unit inputs, to a linear image sensor (charge-coupled device (CCD) sensor), reflected light obtained by performing exposure scanning on an image on a document sheet with light emitted from an illumination lamp to thereby convert information of the image into an electrical signal. The image reader 200 further converts the electrical signal into a luminance signal composed of red (R), green (G), and blue (B) colors and outputs, as image data, the luminance signal to a controller unit 400 to be described.

Document sheets are placed on a document tray 30 of an automatic document feeder (hereinafter referred to as an ADF) 100. When a user gives an instruction to start reading via an operation unit 405 to be described, the controller unit 400 transmits a document reading instruction to the image reader 200. When the image reader 200 receives this instruction, the image reader 200 feeds the document sheets one by one from the document tray 30 of the ADF 100 and performs a reading operation on each document sheet. A document sheet can also be placed on a platen glass, which will be described, to thereby be read. An image forming unit 500 is an image forming device that forms image data received from the controller unit 400 on paper. Furthermore, in accordance with a scan job setting, the ADF 100 separates and feeds the document sheets placed on the document tray 30 one by one to the image reader 200, and discharges them.

An image forming method in the present embodiment is an electrophotographic method using a photosensitive drum or a photosensitive belt. The image forming unit 500 includes, as a paper feeding unit 504, a plurality of cassettes capable of supporting different paper sizes or different paper orientations. Furthermore, printed paper is discharged to a paper discharge unit 502 or a finisher unit 505.

Example of Configuration of ADF 100

Figure 2:
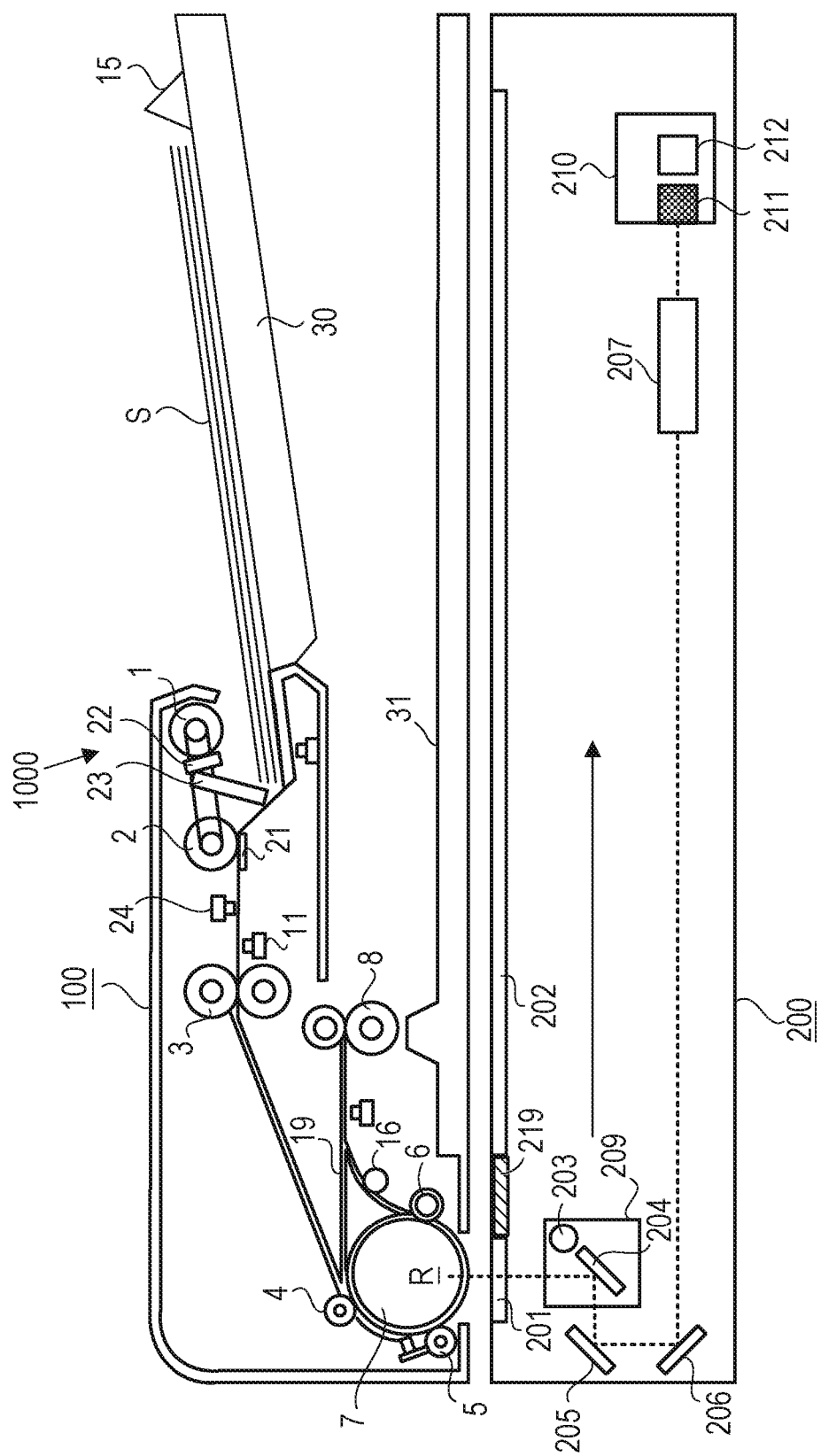
FIG. 2 is a cross-sectional view illustrating an example of a configuration of an automatic document feeder (ADF) and an image reader according to one embodiment.

FIG. 2 is a cross-sectional view illustrating an example of a configuration of the ADF 100 and the image reader 200 according to the present embodiment. An operation performed by the ADF 100 will be described below with reference to FIG. 2.

The ADF 100 illustrated in FIG. 2 includes the document tray 30 on which a document S composed of one or more document sheets is placed, a separation pad 21 that restrains the document S from plunging from the document tray 30 and proceeding downward before document feeding is started, and a paper feeding roller 1.

The ADF 100 further includes a document detection sensor 23 that detects that the document S has been placed on the document tray 30, a distance measuring sensor 22 that measures a distance to an uppermost surface of the document S, and a separation sensor 24 that detects that a document sheet has passed through a separation roller 2. The paper feeding roller 1 drops onto a document surface of the document S placed on the document tray 30 and rotates.

Thus, an uppermost document sheet of the document S is separated from the other document sheets so that document sheets are fed one by one. Specifically, document sheets are fed by the paper feeding roller 1, and one document sheet is separated by the actions of the separation roller 2 and the separation pad 21. The separation is implemented by a known retard separation technique. At this time, if the separation sensor 24 detects no document sheet even when a certain time period (t1) has elapsed since the start of feeding, the controller unit 400 to be described stops the paper feeding roller 1 and the like from being driven. Here, the certain time period (t1) that elapses before the stopping is a time period obtained by adding a time period, which is estimated in accordance with a feeding speed, from when document feeding is started to when a document sheet reaches the separation sensor 24 and an enough time period obtained in view of a delay.

The document sheet separated by the separation roller 2 and the separation pad 21 is fed to a registration roller 4 by a feeding roller pair 3 and caused to strike against the registration roller 4. This loops the document sheet to correct skew caused in feeding the document sheet. On a downstream side of the registration roller 4, a feeding path through which the document sheet having passed through the registration roller 4 is fed toward a sheet-feed reading glass 201 is disposed.

The document sheet fed to the feeding path is fed onto a platen by a large roller 7 and a feeding roller 5. At this time, the large roller 7 comes into contact with the sheet-feed reading glass 201. The document sheet fed by the large roller 7 passes through a feeding roller 6, moves between a roller 16 and a moving glass, and is discharged to a document output tray 31 via a paper discharge flapper and paper discharge rollers 8.

The ADF 100 illustrated in FIG. 2 is of a type where an image on the back side of a document sheet is read by reversing the front and back sides of the document sheet. The paper discharge rollers 8 are rotated backward with the document sheet being caught between the paper discharge rollers 8, the paper discharge flapper is switched, and the document sheet is thereby moved to a reversing path 19. The moved document sheet is caused to strike against the registration roller 4 from the reversing path 19 and is looped again, thereby correcting skew caused in feeding the document sheet. Subsequently, the document sheet is moved to the sheet-feed reading glass 201 again by the feeding roller 5 and the large roller 7, and the back side of the document sheet can thus be read on the sheet-feed reading glass 201.

Furthermore, on the document tray 30, a guide regulation plate 15 that is slidable in a sub-scanning direction of a placed document stack is provided, and a document width detection sensor (not illustrated) that detects a document width in synchronization with the guide regulation plate 15 is also provided. A combination of the above-described document width detection sensor and a pre-registration sensor 11 enables a document size of the document stack placed on the document tray 30 to be determined. Furthermore, a document length detection sensor (not illustrated) provided on a feeding path can detect a document length from a feeding distance from a detected leading end to a detected trailing end of a document sheet being fed. Additionally, a combination of the detected document length and the above-described document width detection sensor also enables a document size to be determined.

Furthermore, the distance measuring sensor 22 is a sensor that measures a distance to an uppermost surface of the document S placed on the document tray 30. For example, when a difference between a distance to an uppermost surface of the document S measured before the start of feeding and a distance to the uppermost surface of the document S measured after a certain time period (t2) has elapsed since the start of feeding is measured for each document sheet, a document sheet abnormal in shape condition, such as a document sheet stapled, can be detected. When the relationship of t1>t2 is satisfied, a document shape anomaly can be detected before a jam occurs.

Example of Configuration of Image Reader 200

In FIG. 2, with respect to a document sheet on a platen glass 202, the image reader 200 causes a scanning unit 209 to scan the document sheet in the sub-scanning direction indicated by an arrow illustrated in FIG. 2 to optically read image information recorded on the document sheet. With respect to document sheets on the ADF 100, the document sheets on the document tray 30 are fed to a reading center position one by one. The scanning unit 209 is also moved to reach the reading center position of the large roller 7 of the ADF 100 and reads each document sheet at the reading center position of the large roller 7. A document sheet on the ADF 100 or a document sheet on the platen glass 202 is read by the following optical system.

This optical system includes the sheet-feed reading glass 201, the platen glass 202, the scanning unit 209 including a lamp 203 and a mirror 204, mirrors 205 and 206, a lens 207, and a CCD sensor unit 210. Read image information is subjected to photoelectric conversion and is input as image data to the controller unit 400 not illustrated in FIG. 1. A white board 219 is a white board for creating white-level reference data used for shading correction. In the present embodiment, the CCD sensor unit 210 is constituted by a color image reading (RGB) CCD (3-line sensor unit) 212 and a monochrome image reading CCD (1-line sensor unit) 211.

Control Block of ADF 100

Figure 3:
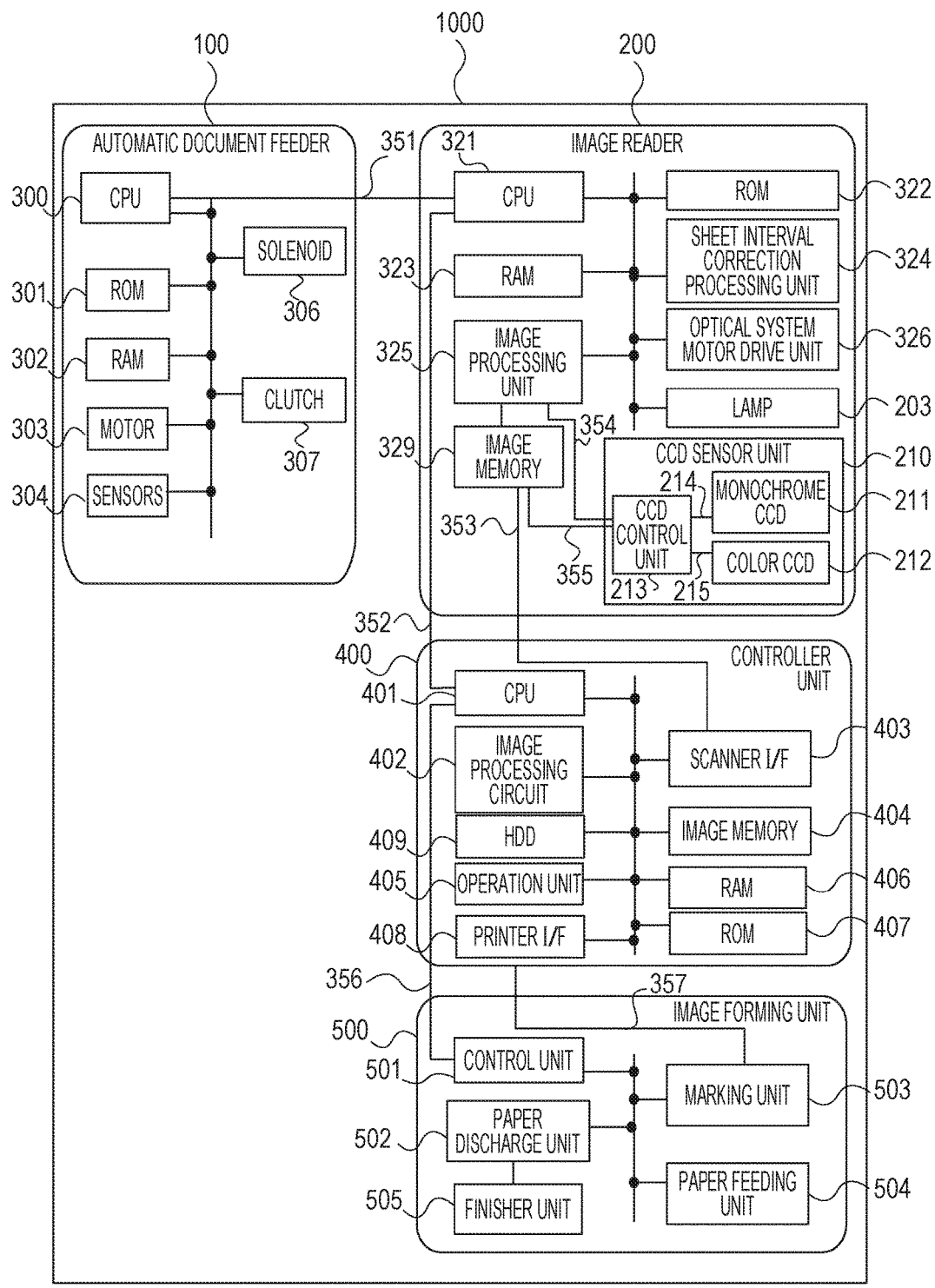
FIG. 3 is a block diagram illustrating a control configuration of the image forming apparatus according to one embodiment.

FIG. 3 is a block diagram illustrating a control configuration of the image forming apparatus according to the present embodiment.

In FIG. 3, a control block of the ADF 100 includes a controller (hereinafter referred to as a CPU) 300 serving as a central processing unit, a read only memory (hereinafter referred to as a ROM) 301, a random access memory (hereinafter referred to as a RAM) 302, an output port, and an input port. In the ROM 301, a control program and fixed parameters are stored. In the RAM 302, input data and working data are stored. A motor 303 for driving various feeding rollers, a solenoid 306, and a clutch 307 are connected to the output port. Various sensors 304 are individually connected to the input port.

The CPU 300 controls paper feeding in accordance with the control program stored in the ROM 301 connected to itself via a bus line. The CPU 300 performs serial communication with a central processing unit (CPU) 321 of the image reader 200 via an image communication line 351, and transmits and receives control data to and from the image reader 200. The image reader 200 is also notified of an image start signal serving as a reference of the start of document image data via the image communication line 351.

Furthermore, the CPU 300 notifies the image reader 200 of values obtained from the various sensors 304 in accordance with control data from the CPU 321 of the image reader 200. Included among values obtained from the various sensors 304 are also data and distance data measured by the distance measuring sensor 22.

Control Block of Image Reader 200

In a control block of the image reader 200, 321 denotes the CPU, and the CPU 321 controls all operations performed in the image reader 200. A ROM 322 that stores a program and a RAM 323 that provides a work area are connected to the CPU 321. The work area provided by the RAM 323 includes a nonvolatile storage area.

A reference numeral 326 denotes an optical system motor drive unit and is a driver circuit for driving an optical system drive motor. The lamp 203 and the CCD sensor unit 210 (the monochrome image reading CCD 211 for a front image and the color image reading CCD 212 for a front image) are connected to the image reader 200. The CPU 321 controls the optical system motor drive unit 326 and controls the CCD sensor unit 210 via an image processing unit 325 to thereby perform image reading processing.

To implement paper feeding, the CPU 321 transmits a paper feeding control command to the CPU 300 for paper feeding control of the ADF 100 via the image communication line 351. The CPU 300 having received the command monitors each sensor 304 installed on the feeding path and drives the motor 303 for feeding, the solenoid 306, and the clutch 307, thereby implementing paper feeding. In this way, the CPU 321 performs paper feeding using the ADF 100 and image reading control using the image reader 200. A reference numeral 324 denotes a sheet interval correction processing unit that corrects an interval between sheets.

An image signal of an image formed on the CCD sensor unit 210 (the color image reading (RGB) CCD 212 or the monochrome image reading CCD 211) by the lens 207 is converted into digital image data. The converted image data is further subjected to shading correction and various types of image processing for detecting and correcting a streak image or the like in the image data by the image processing unit 325 and is written into an image memory 329.

The data written in the image memory 329 is sequentially transmitted to the controller unit 400 via a controller interface image communication line 353 including an image transfer clock signal line. Furthermore, the CPU 321 adjusts timing and notifies the controller unit 400 of an image start signal serving as a reference of the start of document image data via a controller interface control communication line 352. Similarly, with respect to an image start signal provided via the communication line running from the ADF 100 as well, the CPU 321 of the image reader 200 adjusts timing and notifies the controller unit 400 of the image start signal via the controller interface control communication line 352.

The CPU 321 controls the image processing unit 325 connected to a control bus line. Furthermore, the CPU 321 transmits a control signal from the image processing unit 325 to the CCD sensor unit 210 via an image communication line 354 to thereby control the CCD sensor unit 210.

When the CCD sensor unit 210 scans a document image, the color image reading CCD 21.2 or the monochrome image reading CCD 211 reads the document image. An analog image signal of each line read is output to a CCD control unit 213 via an image data communication line 214 or 215 including an image transfer clock signal line.

The CCD control unit 213 converts the analog signal into digital image data and transmits the digital image data to the controller unit 400 through an image communication line 355 including an image transfer clock signal line, through the image memory 329, and through the image communication line 353.

The CPU 321 performs serial communication with a central processing unit (CPU) 401 of the controller unit 400 via the controller interface control communication line 352, and transmits and receives control data to and from the controller unit 400. In response to control data from the central processing unit (CPU) 401 of the controller unit 400, the CPU 321 performs shape anomaly detection for a document sheet being fed. In shape anomaly detection, a difference between a distance to an uppermost surface of the document S measured before the start of feeding and a distance to the uppermost surface of the document S measured after the certain time period (t2) has elapsed since the start of feeding is measured for each document sheet. If the difference is a difference (dl) above a certain value, it is determined that the document sheet is abnormal in shape. Then, the CPU 321 notifies the central processing unit (CPU) 401 of the controller unit 400 of a determination result.

Control Block of Controller Unit 400

The controller unit 400 for image processing controls an entire image forming apparatus 1000 including the ADF 100, the image reader 200, and the image forming unit 500. The controller unit 400 includes the CPU 401, an image processing circuit 402, a scanner interface (I/F) 403, an image memory 404, the operation unit 405, a RAM 406 that provides a work area, a RUM 407 that stores a program, a printer I/F 408, and a hard disk drive (HDD) 409. The work area provided by the RAM 406 includes a nonvolatile storage area. The program may be loaded from the HDD 409 into the RAM 406 and executed by the CPU 401. Image data transmitted to the controller unit 400 via the image communication line 353 is stored into the image memory 404 via the scanner I/F 403.

The image processing circuit 402 performs image conversion on an image in the image memory 404 and returns the image to the image memory 404 again. As an image conversion process performed by the image processing circuit 402, there are a rotation process of rotating a 32×32-pixel image at a specified angle, and a resolution conversion process of converting the resolution of an image. Furthermore, as an image conversion process performed by the image processing circuit 402, there are a scaling process of scaling an image, and a color space conversion process of converting a multi-valued input image by performing a matrix operation and of converting a YUV image into a Lab image by using a look-up table (LUT). This color space conversion has a 3×8 matrix operation and a one-dimensional LUT, thereby enabling a known background removal and show-through prevention to be performed.

The operation unit 405 includes a liquid crystal display (LCD), a touch panel input device attached to the liquid crystal display, and a plurality of hardware keys. A signal input through a touch panel or hardware keys is transmitted to the CPU 401. On the liquid crystal display, functions in operating the image forming apparatus, image data, and the like are displayed.

An image start signal is received from the image forming unit 500 through a controller interface control communication line 356. In accordance with an image start signal serving as a reference of the start of image data, data written into the image memory 404 is sequentially transmitted to the image forming unit 500 through the printer I/F 408 and through a controller interface image communication line 357 including an image transfer clock signal line.

Control Block of Image Forming Unit 500

The image forming unit 500 conveys recording paper, prints image data on the recording paper as a visible image, and discharges the printed recording paper outside the apparatus. The image forming unit 500 includes a control unit 501 that controls the image forming unit 500, the paper feeding unit 504 that has multiple types of recording paper cassettes, and a marking unit 503 that has a function of transferring and fixing image data onto recording paper. The image forming unit 500 further includes the paper discharge unit 502 that has a function of discharging printed recording paper outside the apparatus, and the finisher unit 505 that performs punching and sorting.

If preparation for forming an image is completed by the marking unit 503, the control unit 501 transmits an image start signal serving as a reference of the start of image data to the controller unit 400 through the controller interface control communication line 356. Then, the marking unit 503 transfers and fixes image data transmitted through the controller interface image communication line 357 onto recording paper.

Figure 4:
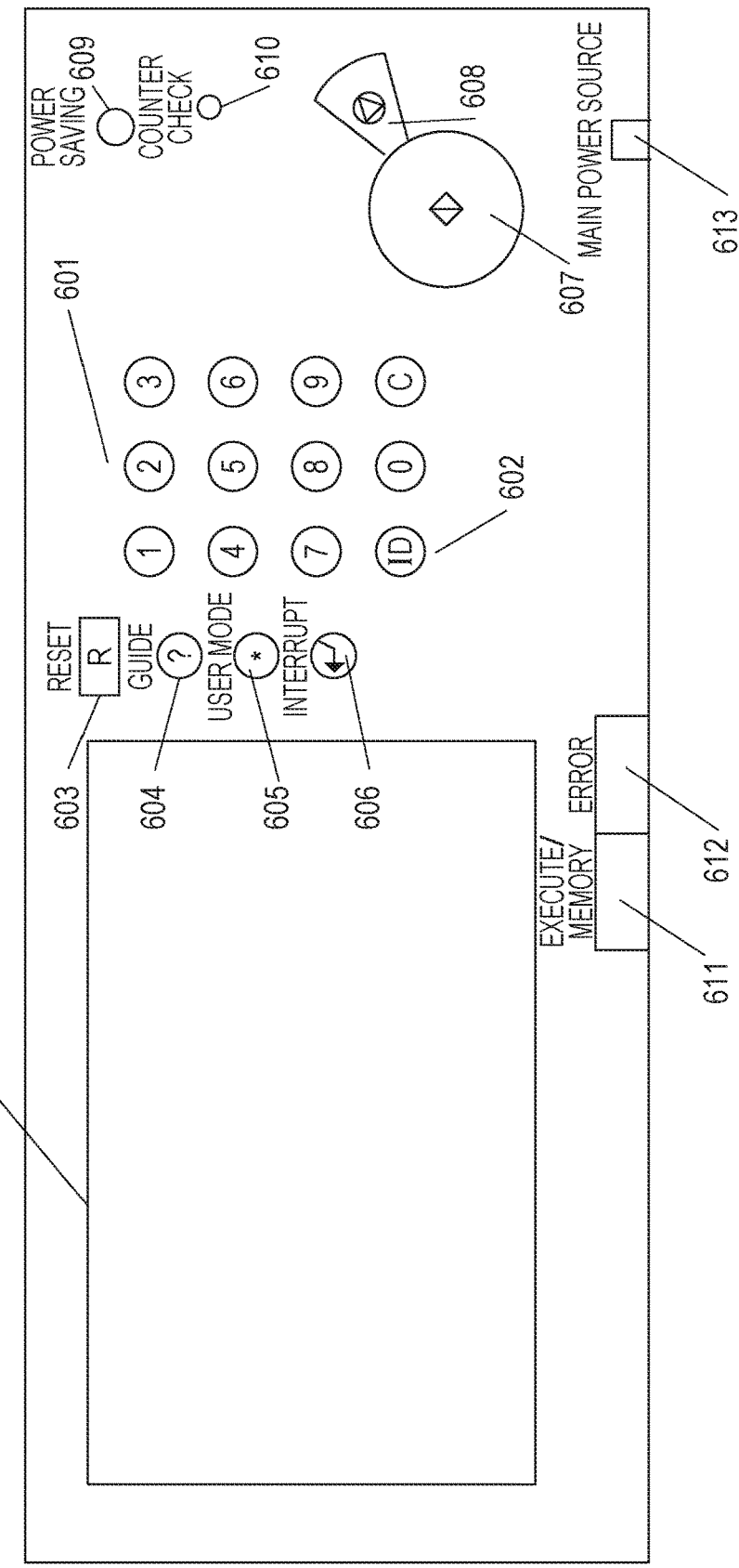
FIG. 4 is a plan view illustrating a configuration of an operation unit according to one embodiment.

FIG. 4 is a plan view illustrating a configuration of the operation unit 405 illustrated in FIG. 3.

In FIG. 4, an LCD touch panel 600 is used to set main mode settings and display a status. A numeric keypad 601 is used to enter numerical values 0 to 9. An ID key 602 is used in entering a department number and an identification mode if the apparatus is managed by each department.

A reset key 603 is used to reset a set mode. A guide key 604 is used to display a screen explaining each mode. An interrupt key 606 is used to perform interrupt copying.

A start key 607 is used to start copying and scanning operations. A stop key 608 is used to abort a job being executed.

A user mode key 605 is used to enter a user mode screen that enables various settings about the apparatus to be set.

A power saving key 609 is pressed down to enter a power saving state and is pressed down again to return from the power saving state. A counter check key 610 is pressed down to display, on the LCD, a count screen indicating the count of the number of copies made before then.

A light-emitting diode (LED) 611 indicates that a job is being executed, or that an image is being stored into the image memory 404. An error LED 612 indicates that the apparatus is in an error state, such as a jam or a door being open. A power source LED 613 indicates that a main switch of the apparatus is on.

Figure 5:
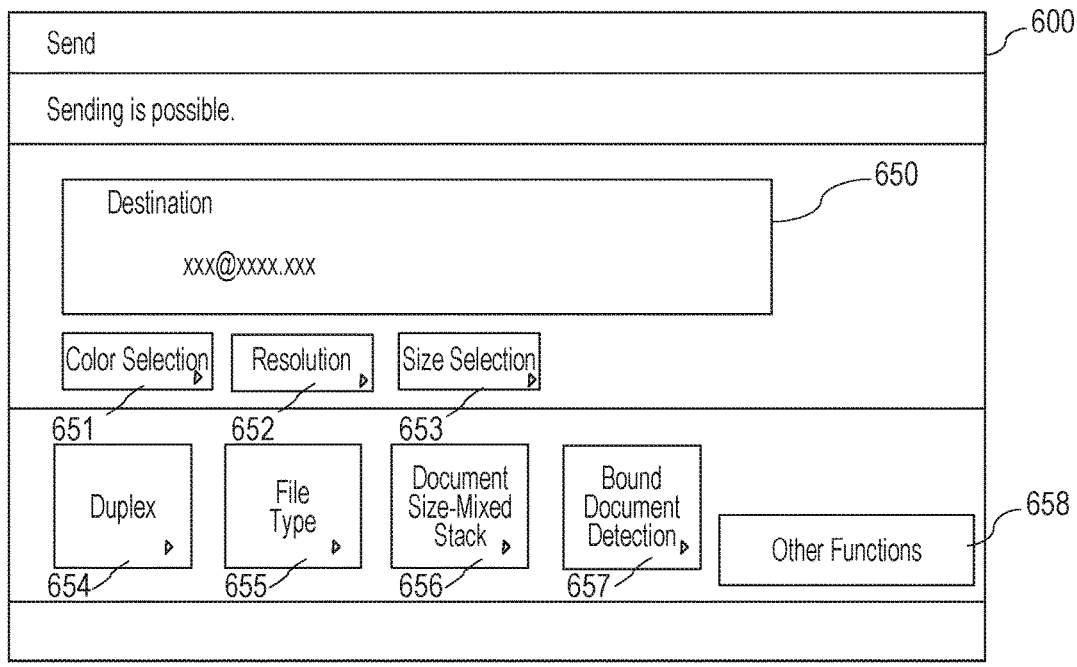
FIG. 5 illustrates a user interface (UI) screen displayed on a liquid crystal display (LCD) touch panel according to one embodiment.
Figure 6:
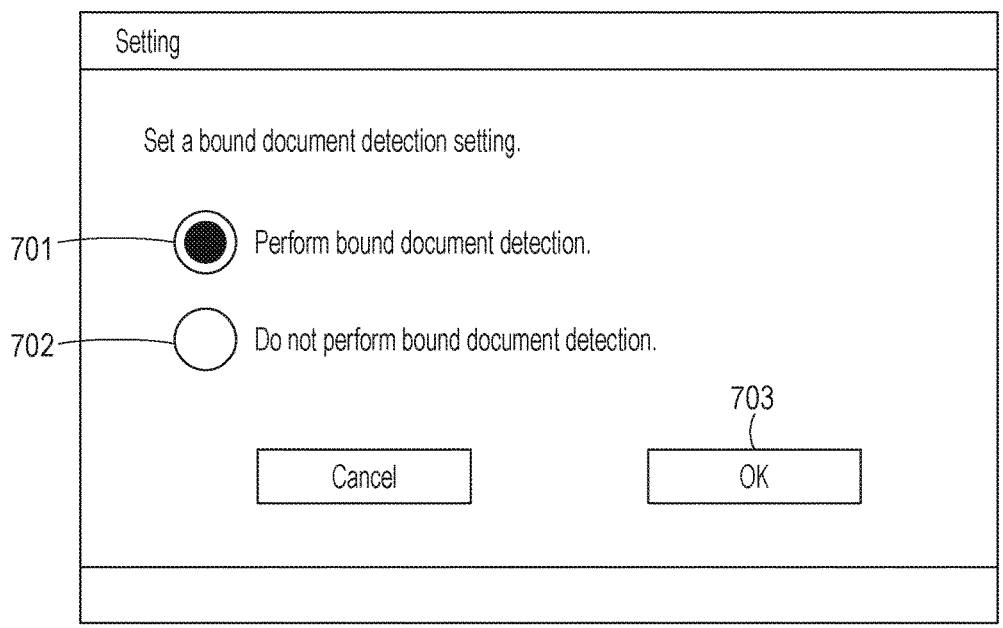
FIG. 6 illustrates a UI screen displayed on the LCD touch panel according to one embodiment.

FIGS. 5 and 6 each illustrate a user interface (UI) screen displayed on the LCD touch panel 600 illustrated in FIG. 4. FIG. 5 illustrates an example of a send screen displayed in executing the send function.

In FIG. 5, buttons for setting, as basic settings, color selection 651, resolution 652, and size selection 653 are arranged as illustrated in FIG. 5.

Settings other than the basic settings can be selected by pressing other functions 658. Although not illustrated here, the other functions 658 includes various functions, such as removal of a blank sheet, and detection of double-feeding of sheets, for example. Among these functions, for functions used frequently by the user, shortcut buttons can be created on a copy screen.

Here, there are arranged a button for duplex 654 for setting duplex reading, and a button for file type selection 655 for setting a send file type. Furthermore, there are arranged a button for document size-mixed stack 656 for reading document sheets having different sizes, and a button for bound document detection 657 for detecting whether the document S fed by the ADF 100 is abnormal in shape.

A UI screen illustrated in FIG. 6 indicates a bound document detection setting screen displayed on the LCD touch panel 600 when the shortcut button for bound document detection 657 is pressed down.

In FIG. 6, a button 701 is a button for enabling a bound document detection mode for detecting whether the document S fed by the ADF 100 in a copy job is abnormal in shape. When an OK button 703 is pressed down, data representing "enabled" or "disabled" is stored into the RAM 406.

On the other hand, a button 702 is a button for disabling the bound document detection mode for detecting whether the document S fed by the ADF 100 in a copy job is abnormal in shape. If the bound document detection mode is enabled, for a job in which it has been detected that a document sheet abnormal in shape is being fed, scanning is interrupted.

Figure 7:
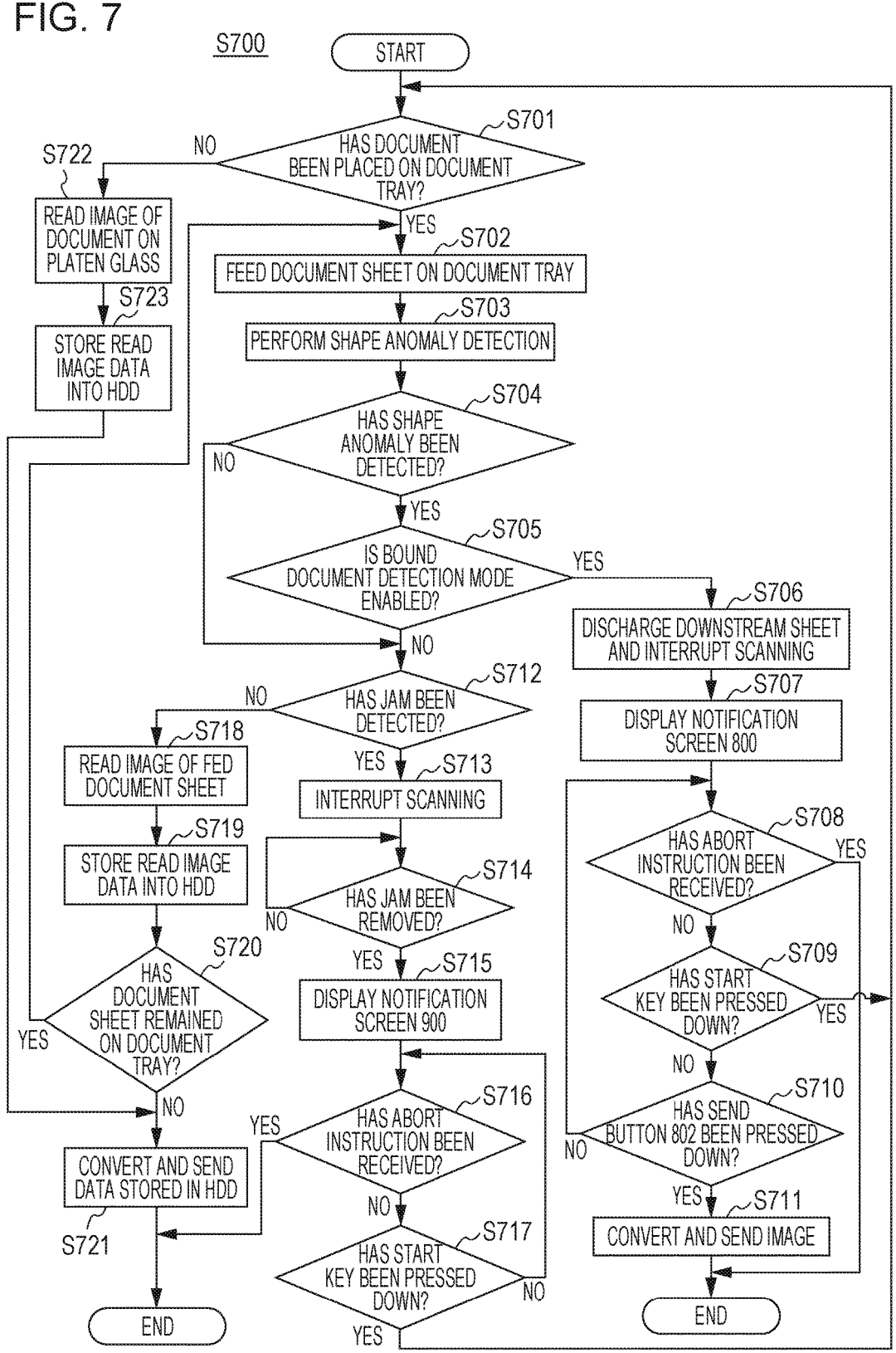
FIG. 7 is a flowchart illustrating a control method for an image reading apparatus according to one embodiment.

FIG. 7 is a flowchart illustrating a control method for the image reading apparatus according to the present embodiment. Steps included in a present process to be performed here are implemented by the CPU 401 of the controller unit 400 executing a control program read from the ROM 407 and loaded into the RAM 406. With the send screen illustrated in FIG. 5 being displayed on the LCD touch panel. 600, and with "Perform bound document detection" being set, a series of processes according to FIG. 7 is started.

In S701, the CPU 401 determines, based on an output from the document detection sensor 23, whether a document S has been placed on the document tray 30. If the CPU 401 determines that the document S has been placed on the document tray 30 (YES in S701), the CPU 401 causes the process to proceed to S702. On the other hand, if the CPU 401 makes a determination of NO in S701, the CPU 401 causes the process to proceed to S722.

In S702, the CPU 401 instructs a control unit (CPU 321) of the image reader 200 to feed a document sheet of the document S placed on the document tray 30.

After the process of S702 is executed, the CPU 401 causes the process to proceed to S703.

In S703, the CPU 401 instructs the control unit (CPU 321) of the image reader 200 to detect whether the document sheet of the document S fed in S702 is abnormal in shape (whether the shape condition is normal). The control unit (CPU 321) of the image reader 200 performs a document shape anomaly detection based on an output from the distance measuring sensor 22 and notifies the CPU 401 of a detection result (S703).

After the process of S703 is executed, the CPU 401 causes the process to proceed to S704. If the CPU 401 receives a notification of a shape anomaly (YES in S704), the CPU 401 causes the process to proceed to S705. On the other hand, if the CPU 401 makes a determination of NO in S704, the CPU 401 causes the process to proceed to S712.

In S705, the CPU 401 determines, with reference to setting information stored in the RAM 406, whether the bound document detection mode is enabled. If the CPU 401 determines that the bound document detection mode is enabled (YES in S705), the CPU 401 causes the process to proceed to S706. On the other hand, if the CPU 401 determines that the bound document detection mode is disabled in S705, the CPU 401 causes the process to proceed to S712.

In S706, the CPU 401 instructs the control unit (CPU 321) of the image reader 200 to interrupt feeding of the document sheet for which binding has been detected and to discharge a downstream sheet (a document sheet not being bound to the document sheet). With interruption of scanning, the CPU 401 stops feeding of the document sheet of the document S and reading of an image of the document sheet of the document S. Bound document detection is not jam detection, and thus a downstream sheet is discharged, thereby making it possible to omit an unnecessary recovery process.

After the process of S706 is executed, the CPU 401 causes the process to proceed to S707. In S707, the CPU 401 displays a notification screen 800 illustrated in FIG. 8 on the LCD touch panel 600.

Figure 9:
FIG. 9 illustrates a UI screen displayed on the LCD touch panel according to one embodiment.
Figure 9:
Figure 9:

A notification screen (display screen) 900 illustrated in FIG. 9 is a screen that prompts the user to place the document S back on the document tray 30 to read the document S from a first page again.

Figure 8:
FIG. 8 illustrates a UI screen displayed on the LCD touch panel according to one embodiment.
Figure 8:
Figure 8:

On the other hand, the notification screen 800 illustrated in FIG. 8 is a screen through which a request for a first recovery process can be received in which, if a shape anomaly in the document sheet of the document S is detected, scanning is continued by placing the document S back on the document tray 30 and reading the document S from a first page again. Furthermore, the notification screen 800 is a screen through which a request for a second recovery process can be received in which image information having been read before a shape anomaly in the document sheet of the document S is detected is sent to a certain destination. Thus, at a point in time when a scan job is interrupted, the user selects another reading or sending of image information having been read before then, thereby solving the issues pointed out. The notification screen 800 illustrated in FIG. 8 is an example indicating that a cause of interruption of a scan job is that document sheets have been bound and indicating that the user removes a staple from the bound document sheets to resolve the cause.

After the process of S707 is executed, the CPU 401 causes the process to proceed to S708. In S708, the CPU 401 determines whether an abort instruction to abort scanning has been received. Specifically, for example, the CPU 401 determines, in accordance with the fact that the user has pressed an abort button 801 on the notification screen 800, that an abort instruction to abort scanning has been received.

If the CPU 401 determines that an abort instruction to abort scanning has been received (YES in S708), the CPU 401 ends the series of processes (S700) according to FIG. 7. On the other hand, if the CPU 401 makes a determination of NO in S708, the CPU 401 causes the process to proceed to S709.

In S709, the CPU 401 determines whether an instruction to resume scanning has been received. Specifically, for example, the CPU 401 determines, in accordance with the fact that the user has pressed the start key 607 on the operation unit 405, that an instruction to resume scanning has been received.

If the CPU 401 determines that an instruction to resume scanning has been received (YES in S709), the CPU 401 causes the process to return to S701 and resumes the scanning process.

On the other hand, if the CPU 401 makes a determination of NO in S709, the CPU 401 causes the process to proceed to S710.

In S710, the CPU 401 determines whether a send button 802 for sending image information having been read before then (before a shape anomaly is detected) on the notification screen 800 has been pressed down. If the CPU 401 determines that the send button 802 has been pressed down (YES in S710), the CPU 401 causes the process to proceed to S711. On the other hand, if the CPU 401 makes a determination of NO in S710, the CPU 401 causes the process to return to S708.

In S711, the CPU 401 converts image data having been scanned before then that is stored in the HDD 409 into a file type selected via the file type selection 655, and sends the converted image data to a destination specified in a destination 650. When all images have been sent, the CPU 401 ends the series of processes (S700) according to FIG. 7.

In S712, the CPU 401 determines whether a paper jam has occurred in the ADF 100. Specifically, for example, if the separation sensor 24 detects no document sheet even when the certain time period (t1) has elapsed since the start of feeding, the CPU 321 of the image reader 200 determines that a jam has occurred.

Then, the CPU 321 notifies the CPU 401 of the controller unit 400 of the occurrence of a jam. The CPU 401 notified of the occurrence of a jam determines that a paper jam has occurred. If the CPU 401 determines that a paper jam has occurred in the ADF 100 (YES in S712), the CPU 401 causes the process to proceed to S713. On the other hand, if the CPU 401 makes a determination of NO in S71.2, the CPU 401 causes the process to proceed to S718.

In S713, the CPU 401 instructs the control unit (CPU 321) of the image reader 200 to interrupt feeding of the document sheet. With interruption of scanning (a scan job), the control unit (CPU 321) of the image reader 200 stops feeding of the document sheet of the document S and reading of an image of the document sheet of the document S.

After the process of S713 is executed, the CPU 401 causes the process to proceed to S714. In S714, the CPU 401 determines whether the paper jam that occurred in the ADF 100 has been removed. For example, the CPU 321 of the image reader 200 checks values obtained from the various sensors 304 provided from the CPU 300 of the ADF 100, and, if the document sheet of the document S is not detected downstream from the separation sensor 24, the CPU 321 determines that the jam has been removed.

Then, the CPU 321 notifies the CPU 401 of the controller unit 400 of jam removal. The CPU 401 notified of the jam removal determines that the paper jam has been removed. If the CPU 401 determines that the paper jam has been removed from the ADF 100 (YES in S714), the CPU 401 causes the process to proceed to S715. On the other hand, if the CPU 401 makes a determination of NO in S714, the CPU 401 repeats the process of S714.

In S715, the CPU 401 displays the notification screen 900 illustrated in FIG. 9 on the LCD touch panel 600. The notification screen 900 illustrated in FIG. 9 is a screen that prompts the user to place the document sheet of the document S on the document tray 30 again.

After the process of S715 is executed, the CPU 401 causes the process to proceed to S716. In S716, the CPU 401 determines whether an abort instruction to abort scanning has been received. For example, the CPU 401 determines, in accordance with the fact that the user has pressed an abort button 901 on the notification screen 900, that an abort instruction to abort scanning has been received.

If the CPU 401 determines that an abort instruction to abort scanning has been received (YES in S716), the CPU 401 ends the series of processes (S700) according to FIG. 7. On the other hand, if the CPU 401 makes a determination of NO in S716, the CPU 401 causes the process to proceed to S717.

In S717, the CPU 401 determines whether an instruction to resume scanning has been received. For example, the CPU 401 determines, in accordance with the fact that the user has pressed the start key 607 on the operation unit 405, that an instruction to resume scanning has been received.

If the CPU 401 determines that an instruction to resume scanning has been received (YES in S717), the CPU 401 causes the process to return to S701. On the other hand, if the CPU 401 makes a determination of NO in S717, the CPU 401 causes the process to return to S716. In S718, the CPU 401 instructs the control unit (CPU 321) of the image reader 200 to read an image of the fed document sheet of the document S.

After the process of S718 is executed, the CPU 401 causes the process to proceed to S719. The CPU 401 instructs the control unit (CPU 321) of the image reader 200 to transfer read image data to the controller unit 400. Then, the CPU 401 stores the image data of the document sheet of the document S transferred to the controller unit 400 into the HDD 409 (S719).

After the process of S719 is executed, the CPU 401 causes the process to proceed to S720.

The CPU 401 determines whether a document sheet of the document S has been placed on the document tray 30. If the CPU 401 determines that a document sheet of the document S has been placed on the document tray 30 (YES in S720), the CPU 401 causes the process to proceed to S702. On the other hand, if the CPU 401 makes a determination of NO in S720, the CPU 401 causes the process to proceed to S721.

In S721, the CPU 401 converts image data having been scanned before then that is stored in the HDD 409 into a file type selected via the file type selection 655, and sends the converted image data to a destination specified in the destination 650.

When the process of S721 is completed, the CPU 401 ends the series of processes (S700) according to FIG. 7.

In S722, the CPU 401 instructs the control unit (CPU 321) of the image reader 200 to read an image of a document S on the platen glass 202. After the process of S722 is executed, the CPU 401 causes the process to proceed to S723. The CPU 401 instructs the control unit (CPU 321) of the image reader 200 to transfer read image data to the controller unit 400. Then, the CPU 401 stores the image data of the document S transferred to the controller unit 400 into the HDD 409 (S723).

After the process of S723 is executed, the CPU 401 causes the process to proceed to S721. The process of S721 is as described above. When the process of S721 is completed, the CPU 401 ends the series of processes (S700) according to FIG. 7. This is a detailed description of a series of processes for receiving an instruction to execute a send job and executing a received copy job.

According to the present embodiment, after a bound document sheet is detected, image data having been read before then can be used. This makes it possible, even if there are multiple users of the image forming apparatus at the same time, to make effective use of data having been read before then without keeping a next user waiting for a long time.

In the above-described embodiment, if a destination selected in the send function via the operation unit 405 includes a fax destination, the CPU 401 performs control so that the screen (FIG. 8) for selecting the first or second recovery process is not displayed on the operation unit 405. This can avoid sending a half-finished document to a destination.

Furthermore, in the above-described embodiment, the case has been described where the screen through which a request for the first or second recovery process is received is displayed if the bound document detection mode is enabled. However, if a document size-mixed stack mode in which document sheets have different sizes is enabled, when a document sheet that is smaller than a document sheet to be previously fed is placed on a bottom side of a document stack, particularly with the document stack being placed on the document tray 30, the user does not become more aware that a stapled document has been placed in many cases.

Thus, the above-described control is performed in combination with the document size-mixed stack, thereby making it possible to provide an opportunity for the user to select a more appropriate recovery process.

Other Embodiments

In the above-described embodiment, after feeding of a bound document sheet is detected, a binding material of the document sheet is removed, and a screen that prompts the user to start reading of the document sheet again is displayed on the LCD touch panel 600. After feeding of a bound document sheet is detected, a screen that prompts the user to place the bound document sheet on the platen glass 202 to read it may be displayed on the LCD touch panel 600.

Furthermore, in the above-described embodiment, based on the shape of a fed document sheet, it is detected that the document sheet is a bound document sheet. It may be detected that a fed document sheet is a bound document sheet by using a method other than the above-described method. For example, a sensor that detects metal may be provided at a paper feeding port through which a document sheet is fed to the feeding path, and it may be detected, in accordance with the fact that the sensor has detected a metal binding material, that the document sheet is a bound document sheet. Furthermore, in the feeding path for a document sheet, sensors that detect the presence or absence of a document sheet are provided a certain distance downstream from the paper feeding port so as to be arranged in a direction perpendicular to a document feeding direction. If only one of the above-described sensors detects the presence of a document sheet, it may be detected that the document sheet is a bound document sheet.

The image reading apparatus described in the present embodiment supplies a program that implements one or more functions in the above-described embodiments to a system or apparatus via a network or a storage medium. Then, the image reading apparatus can also be implemented by causing one or more processors of a computer in the system or apparatus to read and execute the program. Furthermore, the image reading apparatus can also be implemented by a circuit (an application specific integrated circuit (ASIC), for example) that implements one or more functions. Here, as an ASIC, a control circuit designed to execute a process based on each flowchart executes processes based on the CPU 300, the CPU 321, and the CPU 401.

In various embodiments, the image reading apparatus described herein enables, if a scan job is interrupted because a stapled document has been fed, a process of resuming the scan job from the beginning or a process of sending image information having been read before the scan job is interrupted, to be selected.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-233878 filed Dec. 1, 2016, which is hereby incorporated by reference herein in its entirety.

What is claimed is:

1. An image reading apparatus comprising:
   a feeder that feeds a document sheet of a document;
   a reader that reads the document sheet fed by the feeder; and
   a controller that suspends feeding of the document sheet by the feeder in accordance with detection that the document sheet fed by the feeder is bound to another document sheet,
   wherein the controller performs a process for prompting a user to remove a binding material of the document sheet in accordance with the detection.

2. The image reading apparatus according to claim 1, wherein the process is a process for displaying a message for prompting the user to remove the binding material of the document sheet.

3. The image reading apparatus according to claim 2,
   wherein the feeding unit feeds a plurality of document sheets placed on a document tray one by one, and
   wherein the controller further performs a process for notifying the user of start of feeding of the plurality of document sheets from a first document sheet.

4. The image reading apparatus according to claim 1, further comprising:
   a sensor configured to detect a distance from an upper portion of a paper feeding port through which a document sheet is fed to the feeding unit to an upper surface of the document sheet,
   wherein the detection is performed by using output by the sensor.

5. The image reading apparatus according to claim 1, wherein:
   the image reading apparatus sends image data obtained by the reader reading the document sheet to another apparatus, and
   wherein the image reading apparatus displays a screen for selecting sending of image data that is generated by the reader reading a document sheet before feeding of the document sheet is suspended, in accordance with the detection.

6. The image reading apparatus according to claim 1, further comprising:
   a setting unit configured to set whether to enable a function for detecting that the document sheet fed by the feeder is bound to another document sheet.

7. The image reading apparatus according to claim 1, wherein it is detected, based on a shape of the document sheet fed by the feeder, that the document sheet is bound to another document sheet.

8. The image reading apparatus according to claim 1, wherein the controller suspends feeding of a bound document sheet in accordance with the detection and controls discharging of a document sheet having been fed before the bound document sheet.

9. The image reading apparatus according to claim 1, further comprising:
a jam detector that detects a jam of the document sheet fed by the feeder,
wherein the feeder feeds a plurality of document sheets one by one,
wherein the controller suspends feeding of the plurality of document sheets in accordance with jam detection by the jam detector, and
wherein the controller notifies the user of start of feeding of the plurality of document sheets whose feeding has been suspended from a first page of the plurality of document sheets without prompting the user to remove the binding material of the document sheet.

10. A control method for an image reading apparatus, the control method comprising:
feeding a document sheet of a document;
reading the document sheet fed in the feeding;
detecting that the document sheet fed in the feeding is bound to another document sheet;
suspending feeding of the document sheet in accordance with detection in the detecting that the document sheet fed in the feeding is bound to another document sheet; and
prompting a user to remove a binding material of the document sheet accordance with the detection in the detecting.

11. The control method according to claim 10, wherein the image reading apparatus prompts the user to remove the binding material of the document sheet by displaying a message for prompting the user to remove the binding material of the document sheet.

12. The control method according to claim 10, further comprising:
detecting a distance from an upper portion of a paper feeding port through which a document sheet is fed in the feeding to an upper surface of the document sheet,
wherein it is detected that the document sheet is bound to another document sheet, by using a result of the detecting.

13. The control method according to claim 10, further comprising:
sending image data obtained by reading the document sheet in the reading to another apparatus,
wherein a screen for selecting sending of image data that is generated by reading a document sheet in the reading before feeding of the document sheet is suspended is displayed.

14. A non-transitory computer readable storage medium storing a program that, when executed, causes a computer to execute a control process for an image reading apparatus, the control process comprising:
feeding a document sheet of a document;
reading the document sheet fed in the feeding;
detecting that the document sheet fed in the feeding is bound to another document sheet;
suspending feeding of the document sheet in accordance with detection in the detecting that the document sheet fed in the feeding is bound to another document sheet; and
prompting a user to remove a binding material of the document sheet in accordance with the detection result in the detecting.

\* \* \* \* \*